United States Patent
Kamatani et al.

(10) Patent No.: US 10,516,346 B2
(45) Date of Patent: Dec. 24, 2019

(54) POWER CONVERTER FOR CONVERTING DC POWER TO AC POWER WITH ADAPTIVE CONTROL ON CHARACTERISTICS OF LOAD

(71) Applicant: OMRON Corporation, Kyoto-shi, Kyoto (JP)

(72) Inventors: Yuhki Kamatani, Soraku-gun (JP);
Takeo Nishikawa, Kyoto (JP);
Hironori Nakada, Nara (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/181,341

(22) Filed: Nov. 6, 2018

(65) Prior Publication Data

US 2019/0190402 A1    Jun. 20, 2019

(30) Foreign Application Priority Data

Dec. 14, 2017    (JP) ................. 2017-239903

(51) Int. Cl.
*H02M 7/5387*    (2007.01)
*H02M 7/48*    (2007.01)
(Continued)

(52) U.S. Cl.
CPC ......... *H02M 7/53871* (2013.01); *H02M 1/08* (2013.01); *H02M 2001/0009* (2013.01)

(58) Field of Classification Search
CPC ........... H02M 2001/0009; H02M 1/08; H02M 7/53871; H02M 2001/0019; H02M 7/5387; H02M 7/537
See application file for complete search history.

(56) References Cited

U.S. PATENT DOCUMENTS

2011/0309684 A1    12/2011  Song et al.
2014/0346041 A1*   11/2014  Nishijima .......... G01N 27/4067
                                                    204/408
(Continued)

FOREIGN PATENT DOCUMENTS

EP       2977848 A1      1/2016
JP     2005-341680 A    12/2005
(Continued)

OTHER PUBLICATIONS

Machine English traslation of JP 2011055705 A, Mar. 2011 Distributed Power Supply, Power Distribution Facility, and Power Supply Method.*

(Continued)

*Primary Examiner* — Adolf D Berhane
*Assistant Examiner* — Sisay G Tiku
(74) *Attorney, Agent, or Firm* — Metrolex IP Law Group, PLLC

(57) ABSTRACT

A power converter is provided with an inverter unit for converting DC power from a DC power supply into AC power, and a control unit that generates a control signal for controlling the inverter unit. The control unit includes an impedance estimation unit that injects a disturbance signal into a load and derives an estimated value of an impedance of the load based on a voltage signal from the load into which the disturbance signal is injected, the impedance compensator unit whose control parameters are set based on the estimated value of the impedance, and that corrects an output current signal in accordance with the control parameters, a command value unit that outputs a command value indicating a control target value, and a control compensator unit that generates a control signal, based on the command value from the command value unit and the current signal from the impedance compensator unit.

8 Claims, 15 Drawing Sheets

(51) Int. Cl.
 *H02M 1/08* (2006.01)
 *H02M 1/00* (2006.01)

(56) References Cited

U.S. PATENT DOCUMENTS

2016/0028325 A1* 1/2016 Redmann .......... H02M 7/53871
  363/98
2016/0065049 A1 3/2016 Wu et al.
2016/0238660 A1* 8/2016 Narasimha ........... G01R 31/346

FOREIGN PATENT DOCUMENTS

JP 2011-055705 A 3/2011
JP 2011055705 A * 3/2011

OTHER PUBLICATIONS

The Japanese Office Action (JPOA) dated Nov. 20, 2018 in a counterpart Japanese Patent application.
The Extended European search report (EESR) dated Mar. 14, 2019 in a counterpart European Patent application.

* cited by examiner

POWER CONVERTER FOR CONVERTING DC POWER TO AC POWER WITH ADAPTIVE CONTROL ON CHARACTERISTICS OF LOAD

CROSS-REFERENCES TO RELATED APPLICATIONS

This application claims priority to Japanese Patent Application No. 2017-239903 filed Dec. 14, 2017, the entire contents of which are incorporated herein by reference.

FIELD

The present invention relates to a power converter for converting DC (direct current) power into AC (alternating current) power and outputting the AC power.

BACKGROUND

There are power converters that convert DC power generated by a solar cell into AC power. For example, JP 2005-341680A discloses a power controller in a system interconnection system that outputs power output by a DC power supply to a power system. The power controller of JP 2005-341680A includes measurement means for measuring the impedance of the power system, setting means for setting a control parameter relating to power that is output to the power system, based on the measured impedance, and control means for controlling power that is output to the power system using the control parameter. As a result of this configuration, an increase in system voltage is reliably and stably suppressed, and the power generation efficiency and capacity factor are enhanced in the system interconnection system.

JP 2005-341680A is an example of background art.

Generally, a power converter is connected to a system (specifically, pole transformer) via wiring. This wiring has impedance (hereinafter, "system impedance"). In order to perform stable control in a power converter interconnected to a system, it is necessary to set control parameters with consideration for this system impedance. However, the system impedance value changes depending on the length of the wiring, and differs according to the environment in which the power converter is installed.

When designing power converters, it is difficult to gauge the system impedance value of future installation environments beforehand. Thus, heretofore, there were concerns about control becoming unstable in response to the system impedance, and power converters were designed with a margin built into the inductance value of the smoothing inductor for the AC output voltage with consideration for the maximum impedance value that was envisaged. This resulted in increases in the component size and the cost of power converters.

SUMMARY

The present invention has been made in view of the above problems, and provides a power converter that is able to realize favorable control by adapting to characteristics (impedance) of an actual load.

A power converter according to one aspect of the present invention is a power converter for converting DC power from a DC power supply into AC power and outputting the AC power to a load, the power converter including an inverter unit configured to convert DC power from the DC power supply into AC power, a voltage detection unit configured to detect a voltage of the load and generate a voltage signal, a current detection unit configured to detect an output current of the inverter unit and generate a current signal, and a control unit configured to generate a control signal for controlling the inverter unit. The control unit includes an impedance estimation unit configured to inject a disturbance signal into the load and derive an estimated value of an impedance of the load based on the voltage signal from the load into which the disturbance signal is injected, an impedance compensator unit in which a control parameter is set based on the estimated value of the impedance, and that is configured to correct the current signal in accordance with the control parameter, a command value unit configured to output a command value indicating a control target value, and a control compensator unit configured to generate the control signal, based on the command value from the command value unit and the current signal from the impedance compensator unit.

According to the present invention, an estimated value of the impedance of a load is derived, and a control parameter is set based on the estimated value. Thus, impedance compensation adapted to the characteristics of the load can be realized, and favorable control of the load adapted to the characteristics of the load can be realized.

DETAILED DESCRIPTION

Hereinafter, an embodiment according to one aspect of the present invention will be described based on the accompanying drawings.

1 Exemplary Application

Figure 1:
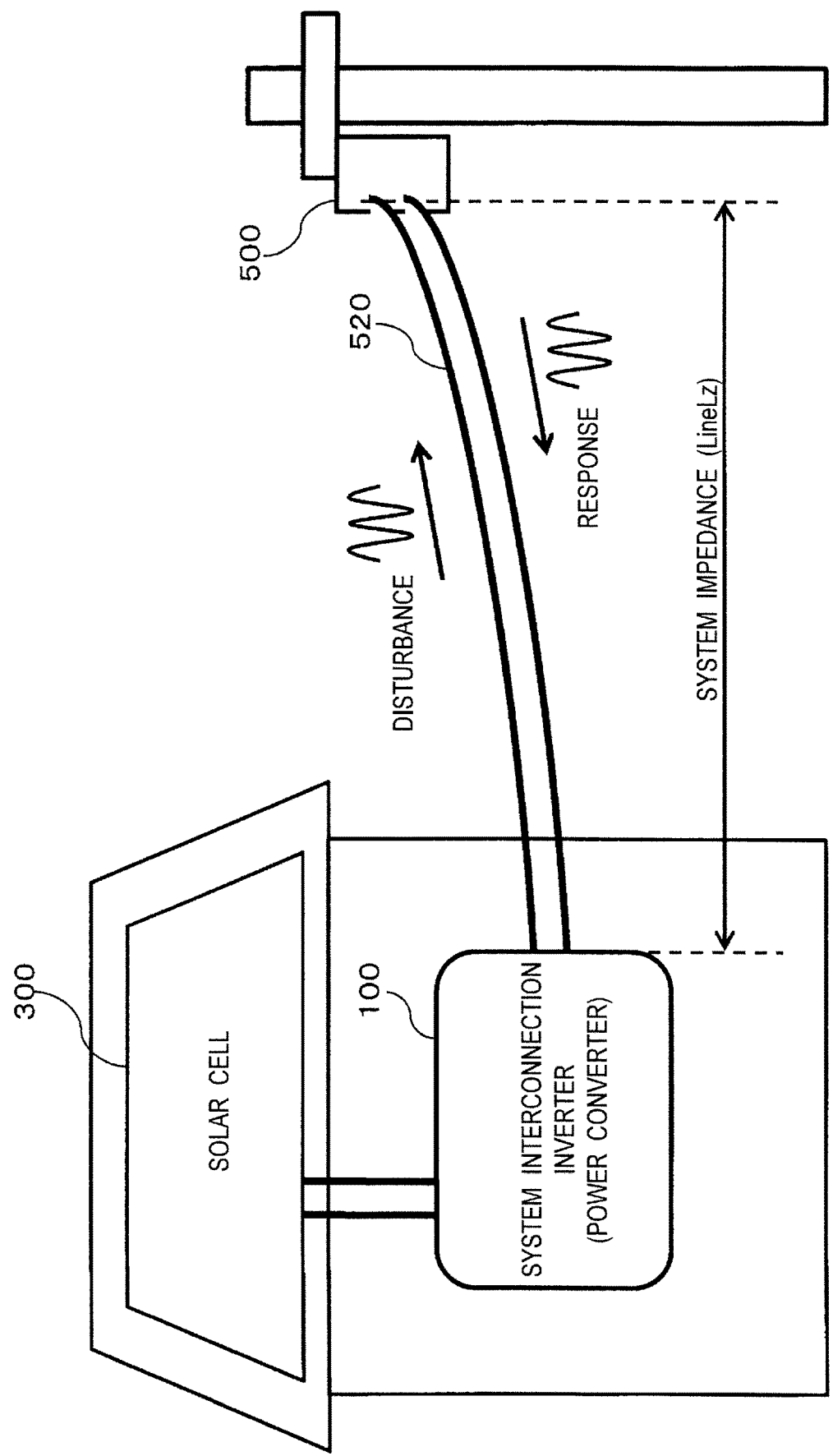
FIG. 1 is a diagram showing an exemplary application of a power converter according to the present invention.

An example of a situation in which a power converter of the present invention is applied will be described using FIG. 1. FIG. 1 is a diagram schematically showing an example in which the power converter of the present invention is applied to a system interconnection inverter 100. The system interconnection inverter 100 is connected to a pole transformer 500 via wiring 520. The system interconnection inverter 100 converts DC power generated by a solar cell 300 into AC power and supplies the AC power to the system. The system interconnection inverter 100 estimates the system impedance (particularly the inductor component (LineLz)), which is the impedance of the wiring 520 from the system interconnection inverter 100 to the pole transformer 500, and sets control parameters such that the control system will be stable, based on the estimated system impedance. Here, the control parameters are setting values for controlling the operating characteristics of the system interconnection inverter 100.

Specifically, the system interconnection inverter 100 injects disturbance (disturbance signal) into the system 500, receives a response to the disturbance from the system 500, estimates the system impedance (LineLz) based on the response, and sets control parameters relating to impedance compensation such that the control system will be stable, based on the estimated system impedance. Appropriate impedance compensation that depends on the conditions of the location in which the system interconnection inverter 100 is installed can thereby be realized, enabling stable control. Also, since the control parameters are set using the system impedance estimated (measured) in the installation environment of the system interconnection inverter 100, it is not necessary to design using large components with a margin built in, and miniaturization of components and cost reduction can be realized.

In the following description, a system interconnection inverter is described as an example of the power converter according to the present invention, but the power converter according to the present invention is not limited to a system interconnection inverter, and can also be applied to an inverter circuit that is used in each of an uninterruptible power supply (UPS), an independent inverter, a servo controller, and a motor controller. That is, the power converter according to the present invention can be widely applied to various devices that convert DC power into AC power and supply the AC power to a load (control target). For example, the power converter of the present invention, when applied to an inverter circuit of a motor controller that controls a motor (load), may estimate the impedance of the motor, and set control parameters relating to impedance compensation, based on the estimated impedance value.

Figure 2:
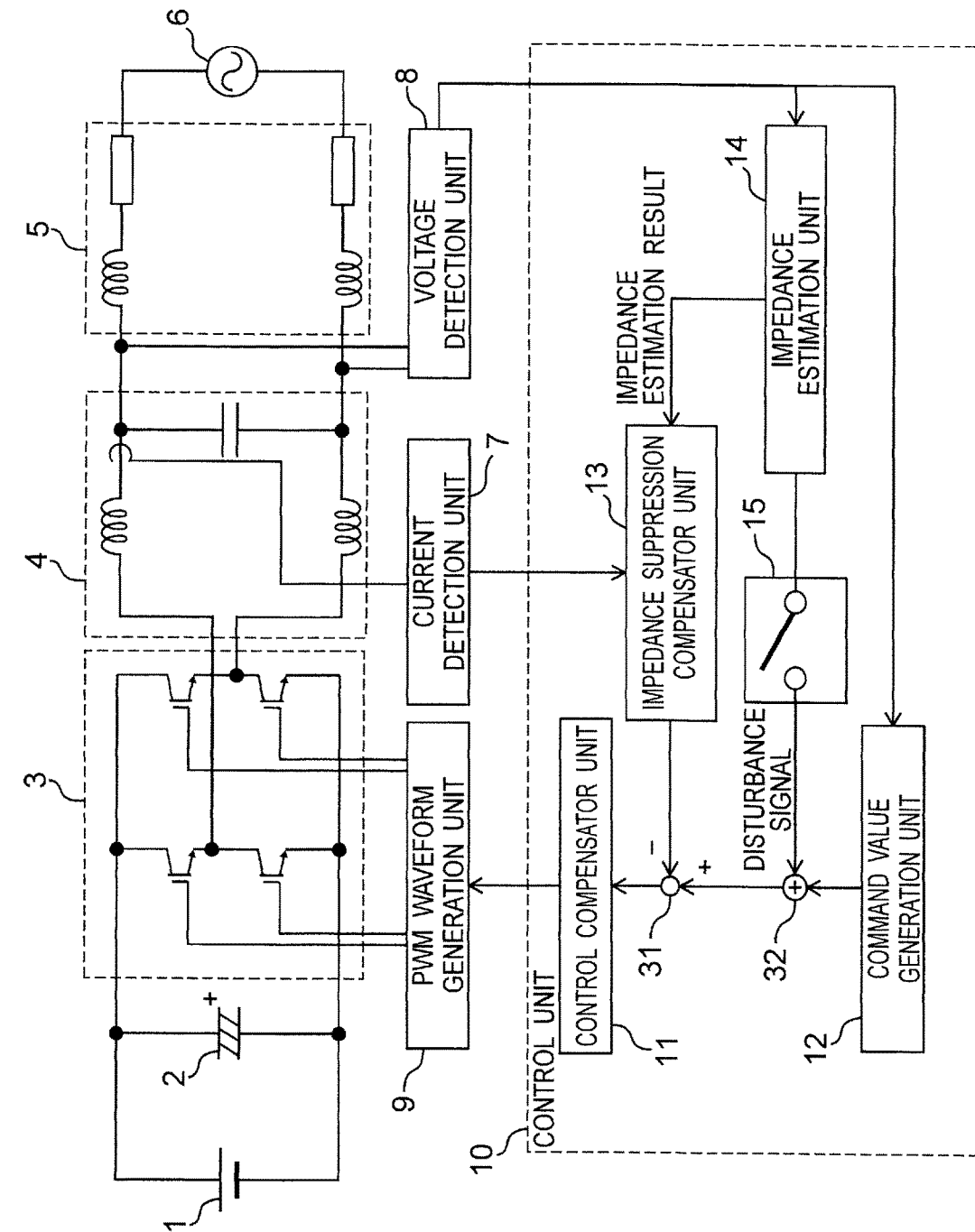
FIG. 2 is a diagram showing an exemplary hardware configuration of a system interconnection inverter (example of the power converter) according to an embodiment.

2 Exemplary Configuration
2.1 Hardware Configuration
2.1.1 System Interconnection Inverter An example of the hardware configuration of the system interconnection inverter 100, which is one embodiment of the power converter according to the present invention, will be described using FIG. 2. FIG. 2 is a diagram schematically showing an example of the hardware configuration of the system interconnection inverter 100. The system interconnection inverter 100 is a device that converts DC power from a DC power supply 1 into AC power and outputs the AC power to a system 6. Here, the DC power supply 1 is a power supply that outputs DC voltage, and is, for example, a solar cell or a fuel cell.

In the example in FIG. 2, the system interconnection inverter 100 is provided with a capacitor 2, an inverter circuit 3, an LC filter circuit 4, a current detection unit 7, a voltage detection unit 8, a PWM waveform generation unit 9, and a control unit 10.

The capacitor 2 smoothes the DC voltage from the DC power supply 1. The inverter circuit 3 is a circuit that converts DC voltage input via the capacitor 2 into AC voltage having a desired frequency and voltage. The inverter circuit 3 includes a full-bridge circuit of switching elements. The LC filter circuit 4 includes an inductor and a capacitor. The LC filter circuit 4 has a function of shaping a pulse waveform that is output by the inverter circuit 3 into a sine waveform. The system interconnection inverter 100 is interconnected to the system 6 via the LC filter circuit 4, and outputs power to the system 6.

In FIG. 2, the impedance of the lead routing between the system interconnection inverter 100 and the system 6 (specifically, pole transformer) is shown as a system impedance 5. The system impedance 5 includes an inductor component and a resistance component. Note that, in the present embodiment, as components of the imaginary part of the system impedance 5, a capacitance component is considered small enough to disregard and only the inductor component is taken into consideration, but the capacitance component may be included in the imaginary part of the system impedance.

The voltage detection unit 8 detects the voltage of the system 6, and outputs a voltage signal indicating the value of the detected voltage. The current detection unit 7 detects the output current of the system interconnection inverter 100, and outputs a current signal indicating the value of the output current.

The PWM waveform generation unit 9 generates a PWM (Pulse Width Modulation) signal for driving each switching element of the inverter circuit 3, based on a control signal from the control unit 10, and outputs the PWM signal to the inverter circuit 3.

The inverter circuit 3 converts the DC voltage smoothed by the capacitor 2 into an AC voltage, and outputs the AC voltage to the system 6 via the LC filter circuit 4.

The control unit 10 generates a control signal for controlling the inverter circuit 3, based on the current signal from the current detection unit 7 and the voltage signal from the voltage detection unit 8, such that the output current of the system interconnection inverter 100 will take a control target value. The control unit 10 is provided with a control compensator unit 11, a command value generation unit 12, an impedance suppression compensator unit 13, an impedance estimation unit 14, a changeover switch 15, a subtractor 31, and an adder 32. The control unit 10 includes a CPU (Central Processing Unit), a RAM (Random Access Memory) and a ROM (Read Only Memory), and controls the constituent elements according to information processing. Programs that are executed by the control unit 10 may be provided via a network or via a recording medium such as an optical disk or a memory card. Also, the control unit 10 may be a semiconductor device (FPGA, ASIC, etc.) designed exclusively in order to realize a predetermined functionality.

The command value generation unit 12 generates a command value, which is a control target value (target current value) of the output of the system interconnection inverter 100, and outputs the command value to the control compensator unit 11.

The control compensator unit 11 performs PID (Proportional Integral Differential) control in accordance with the command value from the command value generation unit 12 and the output from the impedance suppression compensator unit 13, and generates a control signal for driving the inverter circuit 3.

The impedance estimation unit 14 estimates (measures) the system impedance. That is, the impedance estimation unit 14 derives, as an estimated value of the system impedance, the value of the imaginary part (LineLz) attributable to the inductor component of the system impedance. Note that, in the following description, the imaginary part of the system impedance 5 will be referred to simply as "the system impedance", for convenience of description.

Specifically, the impedance estimation unit 14 generates a disturbance signal of a sine wave, and injects the disturbance signal into the system 6. The impedance estimation unit 14 then receives a response (voltage signal) from the system 6 into which the disturbance signal is injected, and derives an estimated value (LineLz) of the system impedance based on the response. The configuration of the impedance estimation unit 14 will be described in detail later. The estimated value of the system impedance derived by the impedance estimation unit 14 is sent to the impedance suppression compensator unit 13.

The changeover switch 15 is a switch for switching between injecting and not injecting the disturbance signal that is output by the impedance estimation unit 14 into the system 6. When the changeover switch 15 is ON, the disturbance signal is injected into the system 6.

The adder 32 adds the disturbance signal from the impedance estimation unit 14 to the command value from the command value generation unit 12.

The impedance suppression compensator unit 13 is means for compensating for the effect of the system impedance. The control parameters of the impedance suppression compensator unit 13 are set based on the estimated value of the system impedance. The impedance suppression compensator unit 13 receives the current signal from the current detection unit 7. During the operation of deriving the estimated value of the system impedance, the impedance suppression compensator unit 13 directly outputs the current signal from the current detection unit 7 (i.e., the current signal from the current detection unit 7 is output after being amplified by a gain 1). On the other hand, at the time of normal operation of the system interconnection inverter 100, the impedance suppression compensator unit 13 corrects the current signal from the current detection unit 7 in accordance with the control parameters. The control parameters are parameters for controlling the operating characteristics of the impedance suppression compensator unit 13, and are, for example, setting values for controlling the gain and/or phase of the output of the impedance suppression compensator unit 13.

The subtractor 31 calculates the difference between the output of the adder 32 and the output of the impedance suppression compensator unit 13.

The control compensator unit 11 generates a control signal for PWM driving each switching element of the inverter circuit 3, based on the output from the subtractor 31, such that the output current of the inverter circuit 3 will take a target value.

2.1.2 Impedance Estimation Unit

Figure 3:
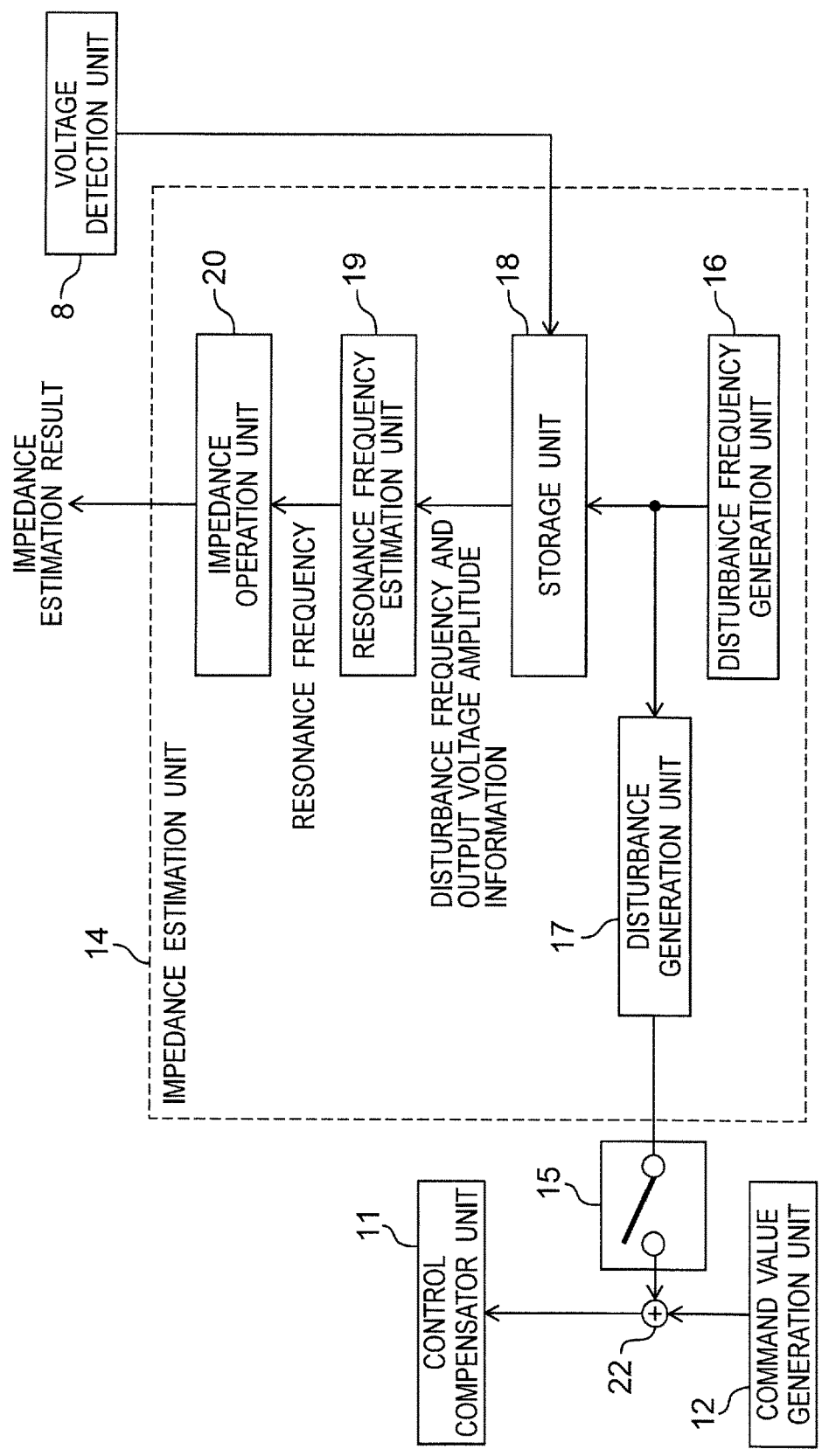
FIG. 3 is a diagram showing an exemplary configuration of an impedance estimation unit in the system interconnection inverter.

FIG. 3 is a diagram schematically showing an example of the configuration of the impedance estimation unit 14 in the system interconnection inverter 100. The impedance estimation unit 14 is provided with a disturbance frequency generation unit 16, a disturbance generation unit 17, a storage unit 18, a resonance frequency estimation unit 19, and an impedance operation unit 20.

The disturbance frequency generation unit 16 sets the frequency of the disturbance signal, and outputs a signal indicating the frequency. The disturbance frequency generation unit 16 changes the frequency of the disturbance signal within a predetermined range (f_min to f_max). The disturbance generation unit 17 generates a disturbance signal of the frequency instructed by the disturbance frequency generation unit 16, based on the output signal from the disturbance frequency generation unit 16. Here, a disturbance signal (Pd) is a sine wave with very low power, and is represented by the following equation.

$$Pd = A\sin(2\pi ft)$$

$$f\_min \leq f \leq f\_max$$

Here, A is the amplitude of the disturbance signal, t is the time period, f is the frequency of the disturbance signal, f_min is the minimum value of the frequency of the disturbance signal, and f_max is the maximum value of the frequency of the disturbance signal.

The storage unit 18 stores the value of the response signal to the disturbance signal and the frequency of the disturbance signal in association with each other. The storage unit 18 is a RAM, for example. The resonance frequency estimation unit 19 derives a resonance frequency fc of a response signal using information stored in the storage unit 18. The impedance operation unit 20 derives and outputs the imaginary part (LineLz) of the system impedance based on the resonance frequency fc.

3 Exemplary Operations

Operations of the system interconnection inverter 100 that is constituted as described above will be described. The system interconnection inverter 100 performs operations for setting control parameters when connected to the system 6. Specifically, the system interconnection inverter 100 estimates the system impedance, and sets the control parameters of the impedance suppression compensator unit 13 based on the value of the estimated system impedance. Thereafter, the system interconnection inverter 100 performs operations for normal operation that involve converting direct current from a DC power supply into alternating current and outputting the alternating current to the system 6. Hereinafter, the operations for normal operation and the operations for setting control parameters by the system interconnection inverter 100 will respectively be described.

3.1 Normal Operation

First, operations for normal operation by the system interconnection inverter 100 will be described. Operations for normal operation are operations for realizing the original function of the system interconnection inverter 100 that involves converting the DC power of the DC power supply 1 into AC power and supplying the AC power to the system 6. Operations for normal operation are performed after the control parameters have been set.

The system interconnection inverter 100 receives the DC voltage from the DC power supply 1. The input DC voltage is smoothed by the capacitor 2, and output to the inverter circuit 3. The inverter circuit 3 converts the DC power into AC power.

The LC filter circuit 4 smoothes the output of the inverter circuit 3, and outputs the smoothed output to the system 6. The current detection unit 7 detects the output current of the inverter circuit 3, and outputs a current signal indicating the detected value. The voltage detection unit 8 detects the output voltage of the inverter circuit 3, and outputs a voltage signal indicating the detected value. The control unit 50 generates a control signal for driving the inverter circuit 3, using the current signal from the current detection unit 7 and the voltage signal from the voltage detection unit 8.

In the control unit 10, at the time of operations for normal operation, the changeover switch 15 is controlled to be OFF, and the impedance estimation unit 14 has stopped its operation. A disturbance signal is thereby not injected into the system 6 at the time of operations for normal operation.

The command value generation unit 12 receives the voltage signal from the voltage detection unit 8, and generates a command value (current command value), which is the control target value. Specifically, the command value generation unit 12 receives the voltage signal from the voltage detection unit 8, generates a sine wave based on the zero cross timing of the voltage signal, and generates a command value in accordance with the sine wave.

The subtractor 31 calculates the difference (current difference) between the command value generated by the command value generation unit 12 and the current signal from the impedance suppression compensator unit 13. The control compensator unit 11 generates a control signal for driving the inverter circuit 3, based on that difference.

At this time, the impedance suppression compensator unit 13 corrects and outputs the current signal from the current detection unit 7. Beforehand, the control parameters of the impedance suppression compensator unit 13 are set based on the estimated value of the system impedance. Thus, a current signal (feedback signal) that compensates for the effect of the system impedance is output from the impedance suppression compensator unit 13.

The PWM waveform generation unit 9 generates a drive signal (PWM signal) for driving each switching element of the inverter circuit 3, in accordance with the control signal from the control unit 10, and outputs the drive signal to the inverter circuit 3. In the inverter circuit 3, each switching element is thereby driven, and desired AC power is generated and output.

3.2 Setting of Control Parameters Based on System Impedance

Next, the operations for setting the control parameters in the system interconnection inverter 100 will be described. The operations for setting of the control parameters are performed at the time of installing the system interconnection inverter 100, for example. In the operations for setting the control parameters, the estimated value of the system impedance (LineLz) is calculated and the control parameters of the impedance suppression compensator unit 13 are set based on the estimated value that is calculated.

Figure 4:
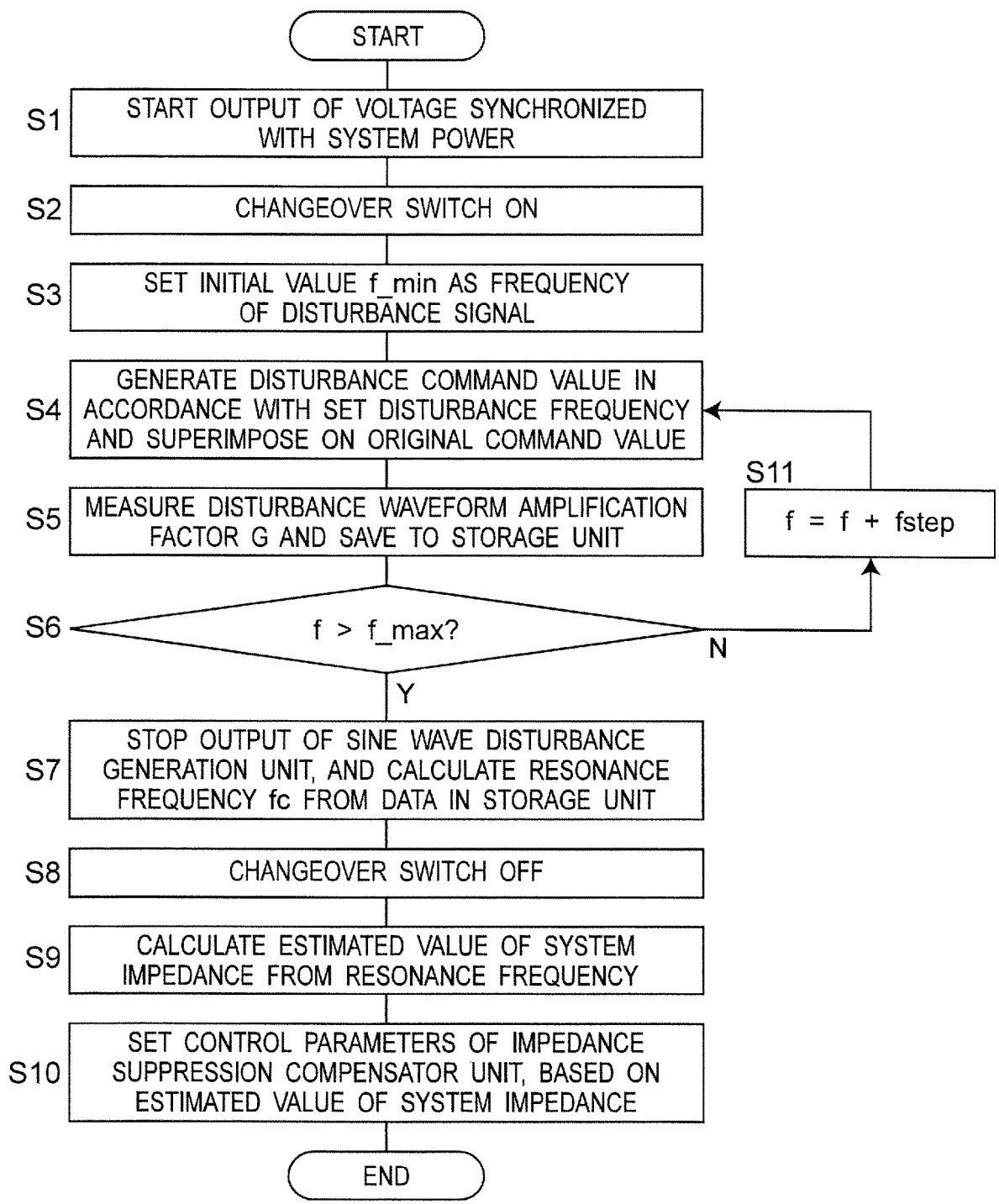
FIG. 4 is a diagram showing the sequence of a control parameter setting operation in the system interconnection inverter.

FIG. 4 is a diagram showing the operation sequence relating to the operations for setting the control parameters of the system interconnection inverter 100. Hereinafter, the operations for setting the control parameters of the system interconnection inverter 100 will be described using FIG. 4.

First, the inverter circuit 3 of the system interconnection inverter 100 starts output of the voltage that is synchronized with system power (S1). The command value generation unit 12 of the control unit 10 thus generates and outputs a command value indicating the control target value.

Thereafter, the control unit 10 controls the changeover switch 15 to be ON, in order to calculate an estimated value of the system impedance (S2). Injection of a disturbance signal for estimating the system impedance into the system 6 thereby becomes possible.

In the impedance estimation unit 14, the disturbance frequency generation unit 16 sets the frequency of the disturbance signal to an initial value f_min (S3). The initial value f_min is the minimum value of the frequency of the disturbance signal. The disturbance generation unit 17 generates and outputs a command value (hereinafter, "disturbance command value") of the disturbance signal having the frequency (f_min) set by the disturbance frequency generation unit 16 (S4). At this time, since the changeover switch 15 is ON, the disturbance command value from the impedance estimation unit 14 is added to the command value from the command value generation unit 12 by the adder 32 (S4).

In the subtractor 31, the difference between the command value to which the disturbance command value was added and the current signal from the impedance suppression compensator unit 13 is calculated. At this time (during calculation of the estimated value of the system impedance), the impedance suppression compensator unit 13 outputs the output signal from the current detection unit 7 directly, that is, after multiplying the output signal by the gain 1.

The control compensator unit 11 generates a control signal of the inverter circuit 3 based on the difference calculated by the subtractor 31, and transmits the control signal to the PWM waveform generation unit 9. The PWM waveform generation unit 9 drives the inverter circuit 3 in accordance with the control signal, and generates AC power that is output to the system 6. As a result, with respect to the system 6, a disturbance signal is injected into the system 6 in addition to the AC power obtained through conversion based on the DC power from the DC power supply 1.

Figure 5:
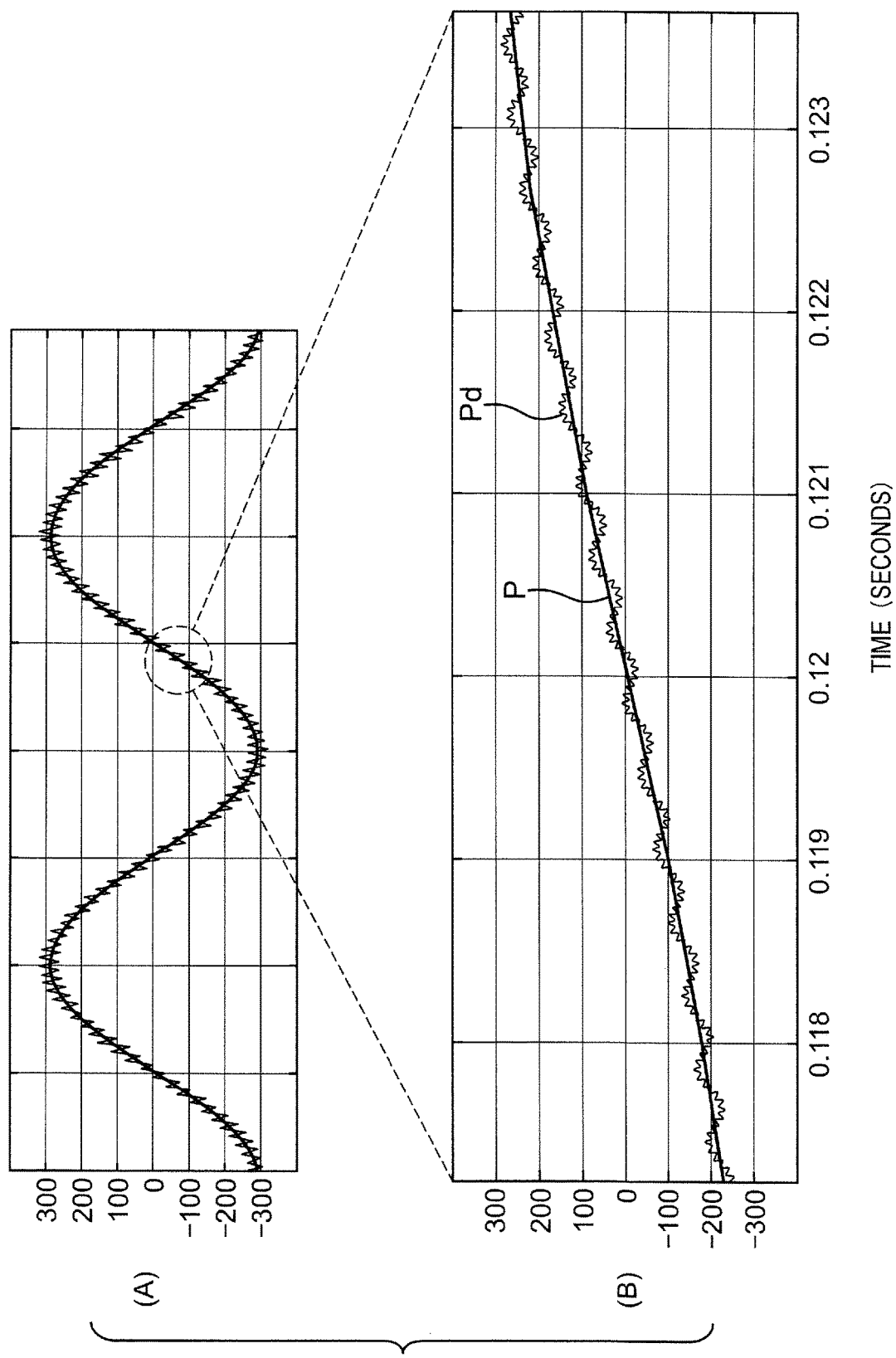
FIG. 5 is a diagram showing an example of a waveform of a disturbance signal that is output by the system interconnection inverter.

FIG. 5 is a diagram showing an example of a waveform of the disturbance signal that is injected into the system 6. FIG. 5(B) is an enlarged view showing the waveform near the zero crossing in the waveform shown in FIG. 5(A). As shown in FIG. 5, the disturbance signal Pd (high frequency sine wave) is superimposed on a waveform P (low frequency sine wave) of the original output power of the system interconnection inverter 100.

Returning to FIG. 4, the impedance estimation unit 14 of the control unit 10 receives the voltage signal from the voltage detection unit 8 as a response to the disturbance signal. The impedance estimation unit 14 measures an amplification factor G of the disturbance waveform from the received response, and saves the amplification factor G to the storage unit 18 in association with the frequency f of the injected disturbance signal (S5).

The control unit 10 repeats the above processing, while changing the frequency of the disturbance signal that is injected at a predetermined interval (fstep) (S11), until the disturbance frequency reaches the maximum value (f_max) (S4 to S6, S11). By adopting this configuration, the disturbance signal is injected into the system 6 while changing the frequency of the disturbance signal stepwise (every fstep) in a predetermined range (f_min to f_max), the response at each frequency is measured, and the amplification factor G of the disturbance waveform is derived.

Figure 6:
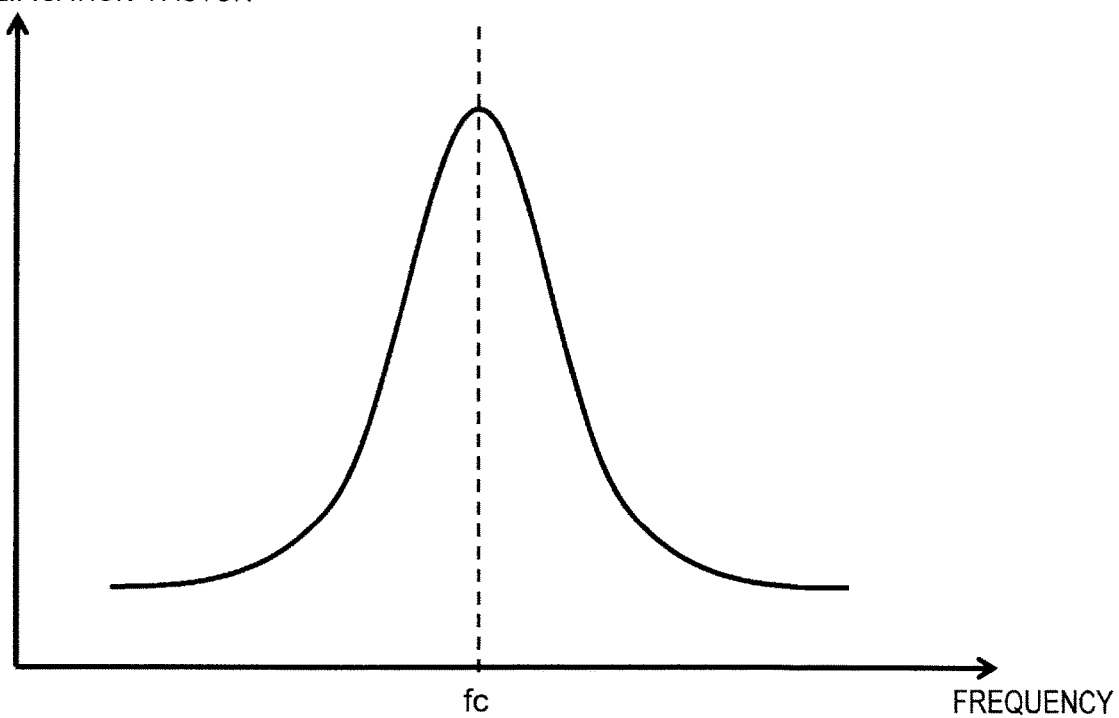
FIG. 6 is a diagram showing an example of the change in a disturbance waveform amplification factor derived from a response signal to a disturbance signal relative to frequency.

When measurement of the response to the disturbance signal is completed for the frequencies in the predetermined range (f_min to f_max) (YES at S6), the disturbance generation unit 17 stops output of the disturbance command value (S7). The resonance frequency estimation unit 19 derives the resonance frequency fc using the data stored in the storage unit 18 (S7). FIG. 6 is a diagram showing an example of the change in the disturbance waveform amplification factor G derived from the response to the disturbance signal relative to frequency. The resonance frequency estimation unit 19 derives the frequency when the disturbance waveform amplification factor G is at a maximum as the resonance frequency fc.

Thereafter, the changeover switch 15 is set to OFF (S8). The impedance operation unit 20 calculates an estimated value (LineLz) of the system impedance from the resonance frequency fc (S9). The method for calculating the estimated value (LineLz) of the system impedance will be described in detail later.

The impedance suppression compensator unit 13 sets the control parameters based on the estimated value (LineLz) of the system impedance that is calculated (S10). The configuration and operations of the impedance suppression compensator unit 13 will be described in detail later.

As described above, the system interconnection inverter 100 of the present embodiment injects a disturbance signal into the system 6, measures the response to the injected disturbance signal, and measures the system impedance (LineLz) based on the measured response. The system interconnection inverter 100 then sets the control parameters of the impedance suppression compensator unit 13 based on the measured system impedance (LineLz).

In this way, the system impedance (LineLz) is actually measured and the control parameters are set based on the measured system impedance, thus enabling favorable control adapted to the installation conditions (system impedance) of the system interconnection inverter 100.

3.2.1 Calculation of Estimated Value of System Impedance

Hereinafter, a method for calculating the system impedance (LineLz) from the resonance frequency fc will be described, with reference to FIG. 7.

Figure 7:
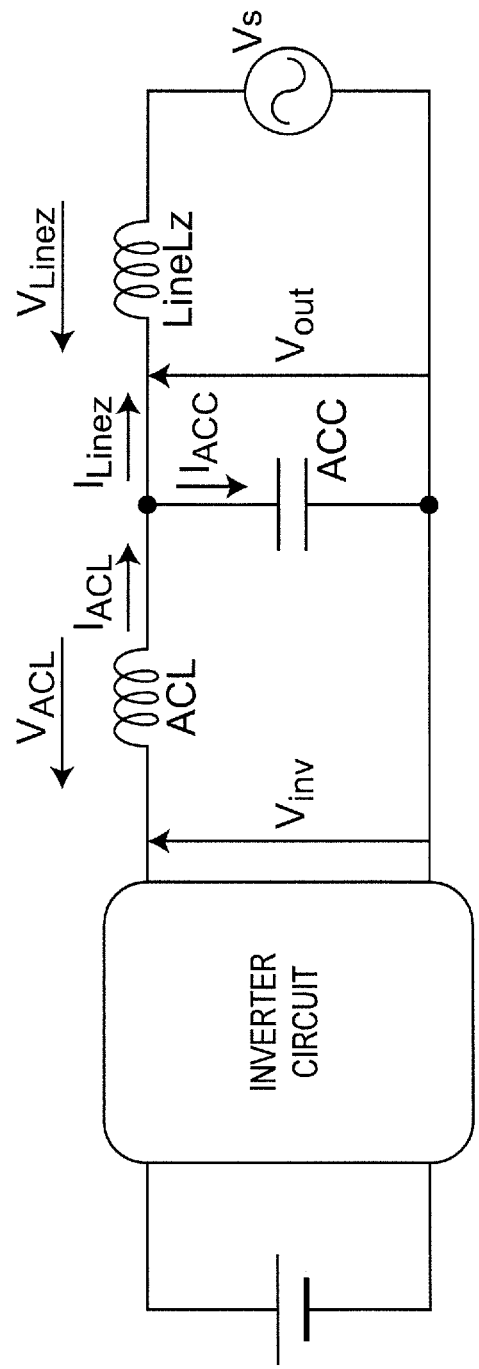
FIG. 7 is a diagram for illustrating a method for calculating system impedance (LineLz) from a measured resonance frequency (fc).

FIG. 7 is a diagram showing the inverter circuit 3 of the system interconnection inverter 100 of the present embodiment and an equivalent circuit of the system 6. The circuit equation for the equivalent circuit of FIG. 7 is as shown in the following equation (1).

$$Vout(s) = \frac{\left(\frac{Vinv(s)}{ACLs} + \frac{Vs(s)}{LineLzs}\right) \times \frac{1}{ACCs}}{1 + \left(\frac{1}{ACLs} + \frac{1}{LineLzs}\right) \times \frac{1}{ACCs}} \quad (1)$$

Here, Vinv is the output of the inverter circuit 3, Vout is the output of the system interconnection inverter 100, ACL is the inductor component of the LC filter circuit 4, ACC is the capacitance component of the LC filter circuit 4, and LineLz is the value of the imaginary part (amount contributed by the inductor) of the system impedance.

In equation (1), when the output Vout(s) of the system interconnection inverter 100 is at a maximum, the denominator is at a minimum, that is, the denominator becomes even closer to 0 without limit. Therefore, when equation (1) is solved for LineLz where the denominator is 0, the following equation (2) is obtained.

$$LineLz = \frac{ACL}{ACL \times ACC \times (2\pi f)^2 - 1} \quad (2)$$

Here, $s = j2\pi f$ (where j is the imaginary unit and f is the frequency).

ACL and ACC are component constants and are known values. The output Vout(s) of the system interconnection inverter 100 is at a maximum when the frequency f is the resonance frequency fc. Therefore, the system impedance LineLz can be derived, by substituting the value of the resonance frequency fc for f in equation (2).

Figure 8:
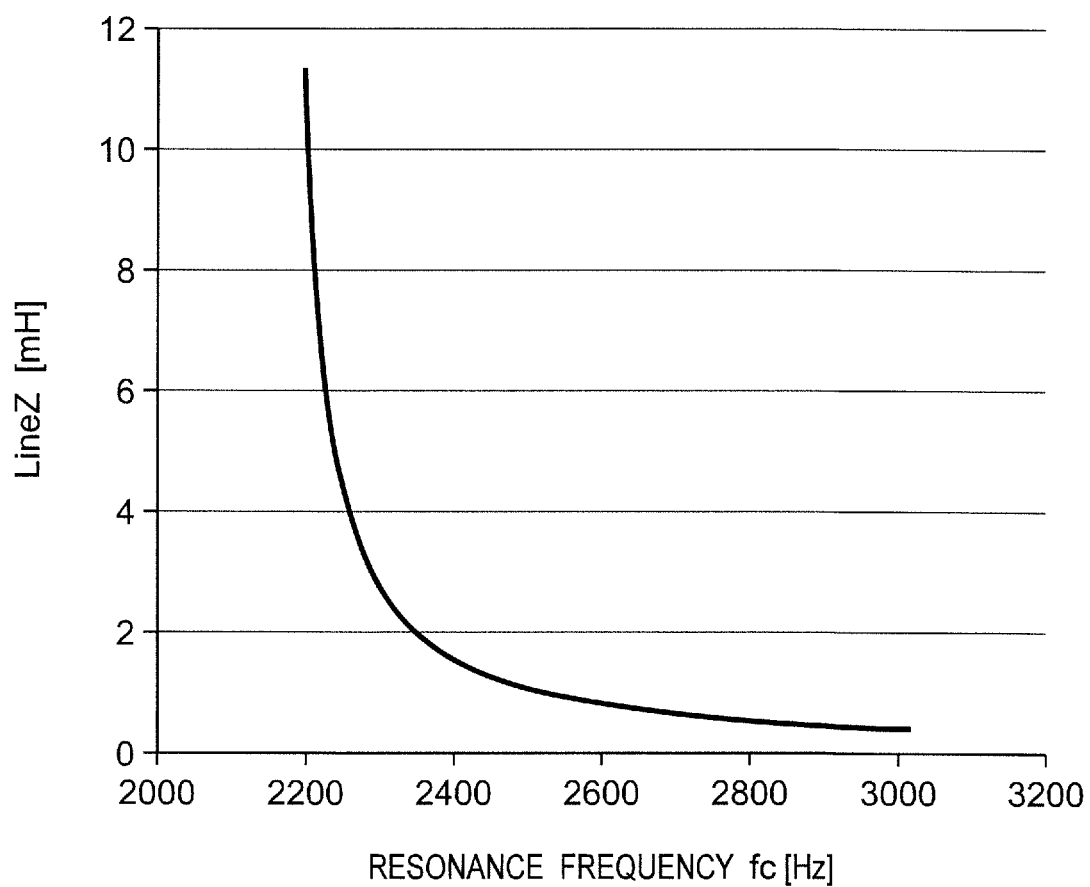
FIG. 8 is a diagram showing the relationship between measured resonance frequency (fc) and system impedance (LineLz).

The values of ACL and ACC are determined at the time of hardware design. FIG. 8 is a diagram showing the relationship between the resonance frequency fc and the system impedance LineLz, which is based on the above equation (2), when ACL=0.00036H and ACC=0.000015F, for example. The designer appropriately sets the range of the system impedance LineLz as a specification. If the range of values of the system impedance LineLz that are desirably measured is known in advance, the range over which the frequency of the response signal can change, that is, the minimum f_min and maximum f_max of the frequency, can be determined from the relationship shown in FIG. 8. For example, in the case where ACL=0.00036H and ACC=0.000015F, and the range of values of the system impedance LineLz that are desirably derived is 0.1 mH to 8 mH, the maximum f_max and minimum f_min of the frequency will, from the relationship in equation (2), respectively be 4645.176 Hz and 2214.019 Hz.

Figures 9A, 9B:
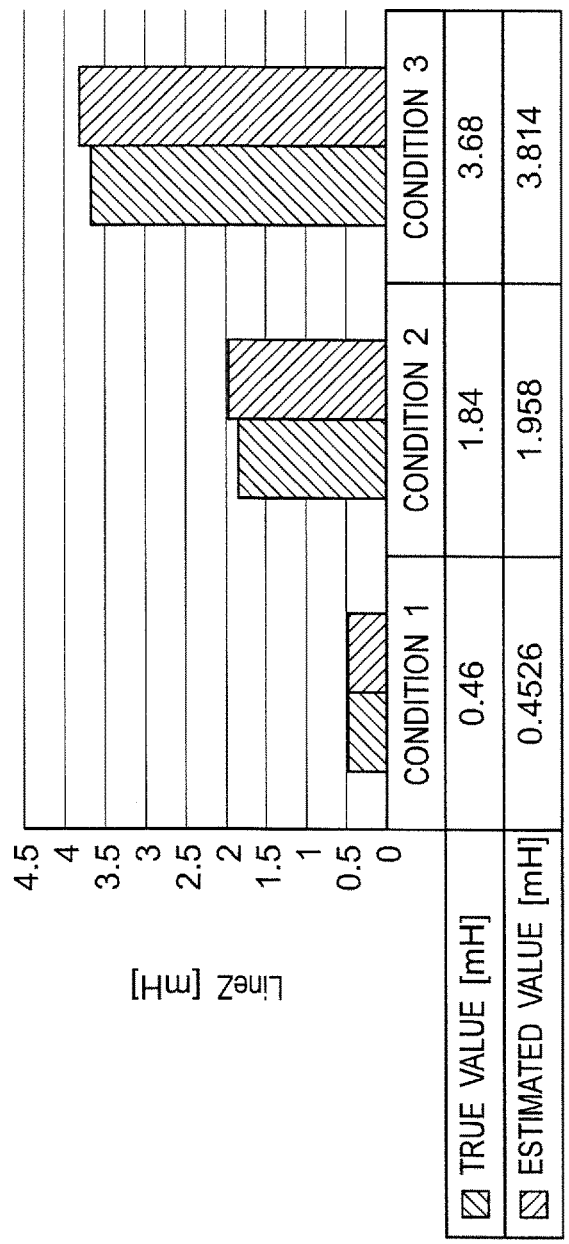
FIGS. 9A and 9B are diagrams showing results of simulating impedance estimation.

FIGS. 9A and 9B are diagrams for illustrating the accuracy of the estimated value of the system impedance derived by the above method. FIG. 9A is a diagram that numerically contrasts error between the true value and the estimated value for three different system impedances. FIG. 9B is a diagram representing the values shown in FIG. 9A with a graph. It is evident from these diagrams that the estimated value of the system impedance is accurately obtained by the method shown in the present embodiment.

3.3 Operation and Effect

As described above, the system interconnection inverter 100 (example of the power converter) of the present embodiment is a device that converts DC power from the DC power supply 1 into AC power and outputs the AC power to the system 6 (example of the load). The system interconnection inverter 100 is provided with the inverter circuit 3 (example of the inverter unit) that converts DC power from the DC power supply 1 into AC power, the voltage detection unit 8 that detects the voltage of the system 6 and generates a voltage signal, the current detection unit 7 that detects the output current of the inverter circuit 3 and generates a current signal, and the control unit 10 that generates a control signal for controlling the inverter circuit 3.

The control unit 10 includes the impedance estimation unit 14 that injects a disturbance signal into the system 6 and derives an estimated value of the system impedance (example of the impedance of the load) based on the voltage signal from the system 6 into which the disturbance signal is injected, the impedance suppression compensator unit 13 (example of the impedance compensator unit) in which control parameters are set based on the estimated value of the system impedance, and that corrects the current signal in accordance with the control parameters, the command value generation unit 12 (example of the command value unit) that outputs a command value indicating a control target value, and the control compensator unit 11 that generates a control signal based on the command value from the command value generation unit 12 and the current signal from the impedance suppression compensator unit 13.

As a result of adopting the above configuration, the system interconnection inverter 100 injects a disturbance signal into the system 6, derives an estimated value (LineLz) of the system impedance based on the response to the disturbance signal, and sets the control parameters based on the estimated value. Impedance compensation can thereby be realized based on the system impedance in the actual use environment of the system interconnection inverter 100, and favorable power control adapted to the system impedance can be realized. As a result, it becomes unnecessary to build a margin into the design with consideration for the maximum value of the impedance that is envisaged in advance as was heretofore required, and the components of the system interconnection inverter 100 can be designed to be physically small, enabling increases in the size and cost of the system interconnection inverter 100 to be suppressed.

4 Variations 4.1 First Variation

In the first variation, a specific example of the configuration of the impedance suppression compensator unit 13 in the control unit 10 will be described. In the first variation, a notch filter is applied to the impedance suppression compensator unit 13, in order to suppress an increase in gain due to the resonance point of the system impedance (LineLz) and the impedances (ACL, ACC) of the LC filter circuit 4.

Figure 10:
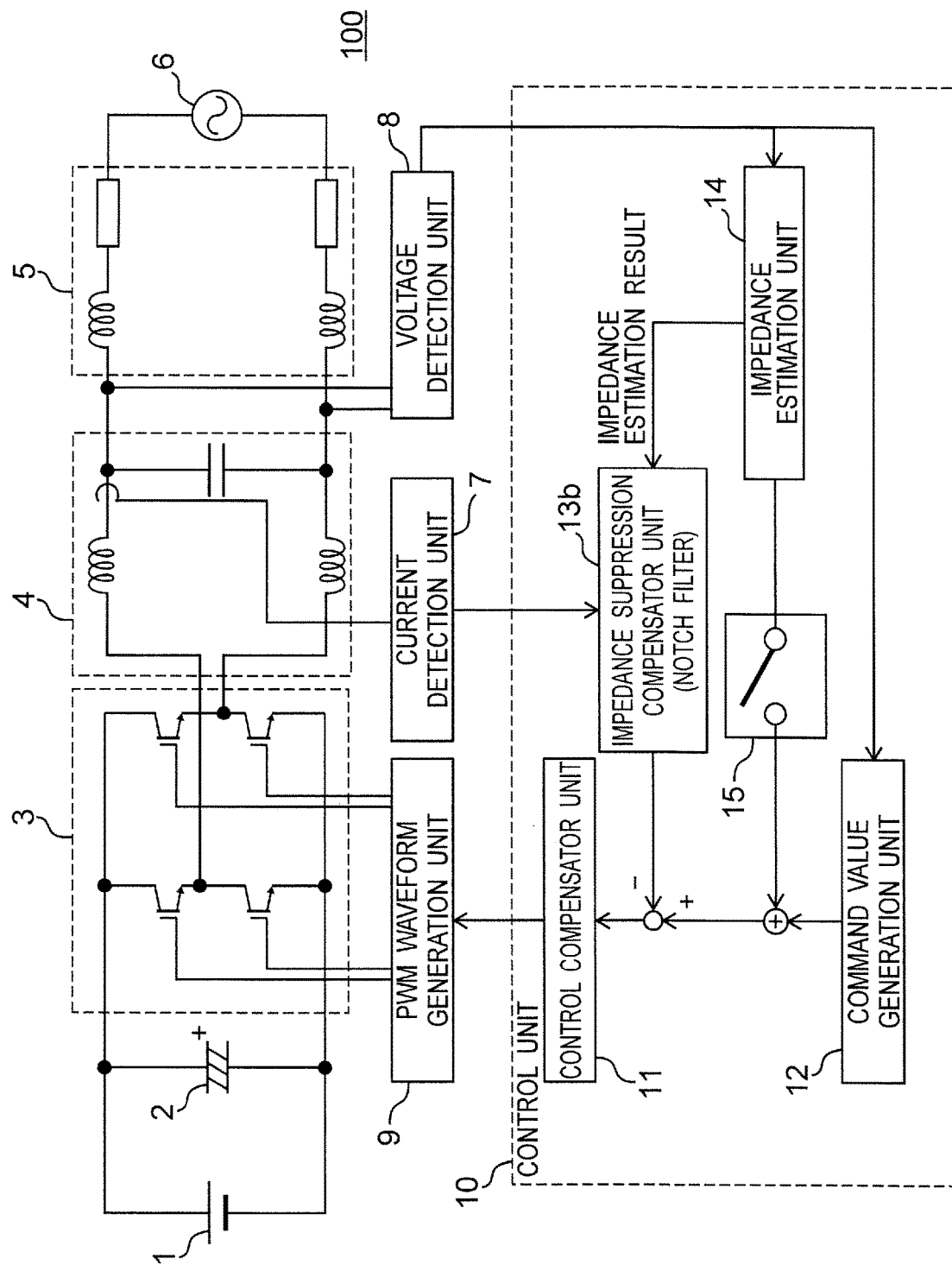
FIG. 10 is a diagram showing an exemplary configuration in which a notch filter is applied to an impedance suppression compensator unit in a system interconnection inverter according to a first variation.

FIG. 10 shows an exemplary configuration of the system interconnection inverter 100 to which a notch filter 13b is applied. Characteristics (transfer function) of the notch filter 13b are shown below using a center frequency fs.

$$\frac{s^2 + (2\pi f_s)^2}{s^2 + 2\pi f_s \xi s + (2\pi f_s)^2} \tag{3}$$

On the other hand, the resonance point fs of the current control system is derived with the following equation. Here, ACL is the inductor component of the LC filter circuit 4, and ACC is the capacitance component of the LC filter circuit 4.

$$fs = \frac{\sqrt{\frac{\frac{1}{ACL} + \frac{1}{LineLz}}{ACC}}}{2\pi} \tag{4}$$

The control unit 10 calculates the value of the resonance point fs in accordance with the estimated value of the system impedance LineLz received from the impedance estimation unit 14 and equation (4), and sets the calculated value of the resonance point fs as the center frequency fs (refer to equation (3)) in the notch filter 13b. In this way, the gain at the resonance point is suppressed, by setting the center frequency fs of the notch filter 13b as a control parameter, based on the estimated value of the system impedance LineLz.

Figure 11:
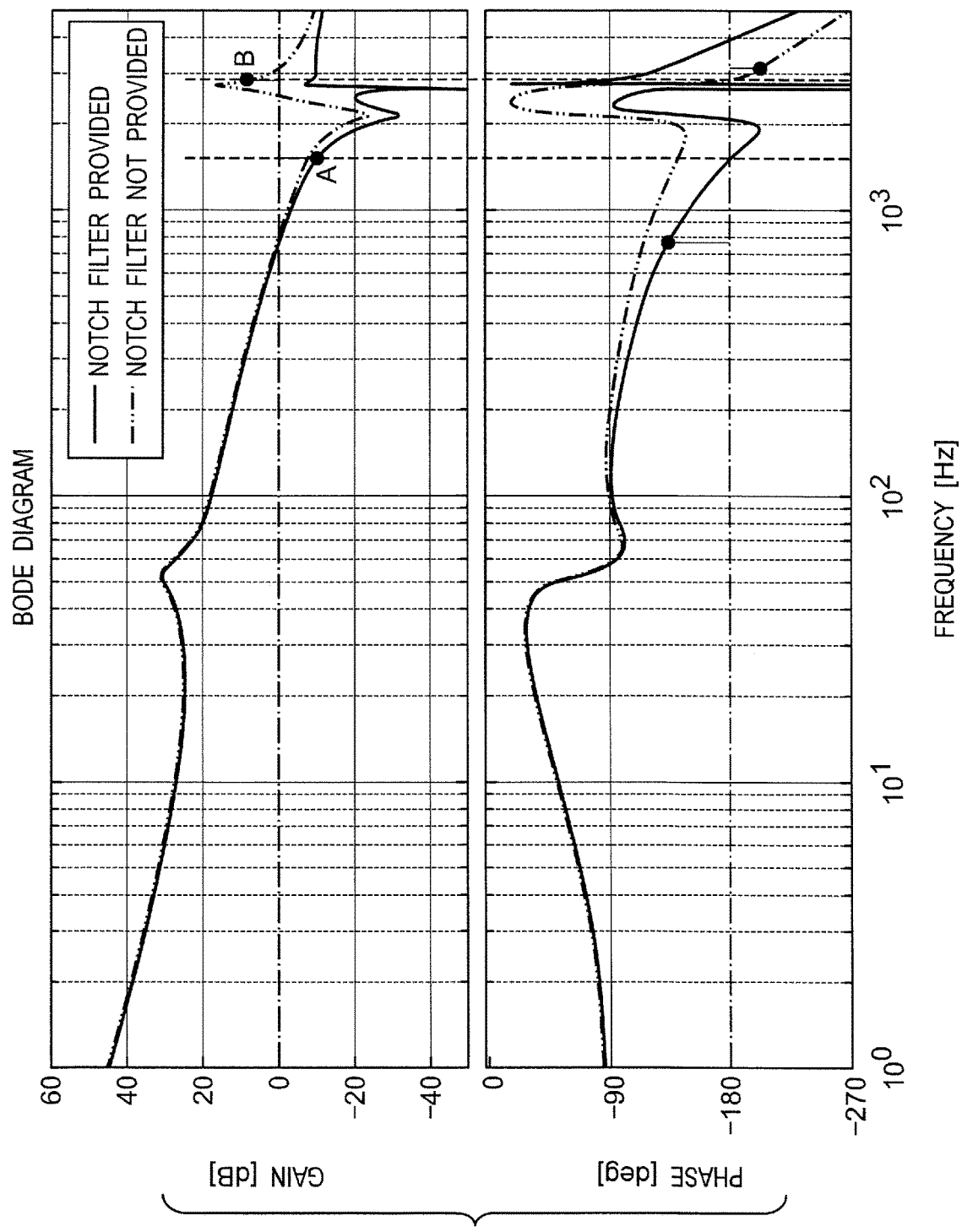
FIG. 11 is a Bode diagram in cases where a notch filter is and is not provided in the system interconnection inverter.

FIG. 11 is a Bode diagram of the system interconnection inverter 100 in cases where the notch filter 13b is and is not provided. As shown in FIG. 11, in the case where the notch filter 13b is not provided, the gain (B point) at the frequency at which the phase shifts 180 degrees exceeds 0 dB, as shown by the two-dot chain line. The control system thus becomes unstable. On the other hand, in the case where the notch filter 13b is installed in the impedance suppression compensator unit 13, the gain (A point) at the frequency at which the phase shifts 180 degrees is suppressed to less than 0 dB, as shown by the solid line in FIG. 11. The control system can thus be stabilized.

4.2 Second Variation

In the second variation, another specific exemplary configuration of the impedance suppression compensator unit 13 in the control unit 10 will be described. In the second variation, a phase advance compensator is applied to the impedance suppression compensator unit 13, in order to suppress phase delay due to the resonance point of the system impedance (LineLz) and the impedances (ACL, ACC) of the LC filter circuit 4.

Figure 12:
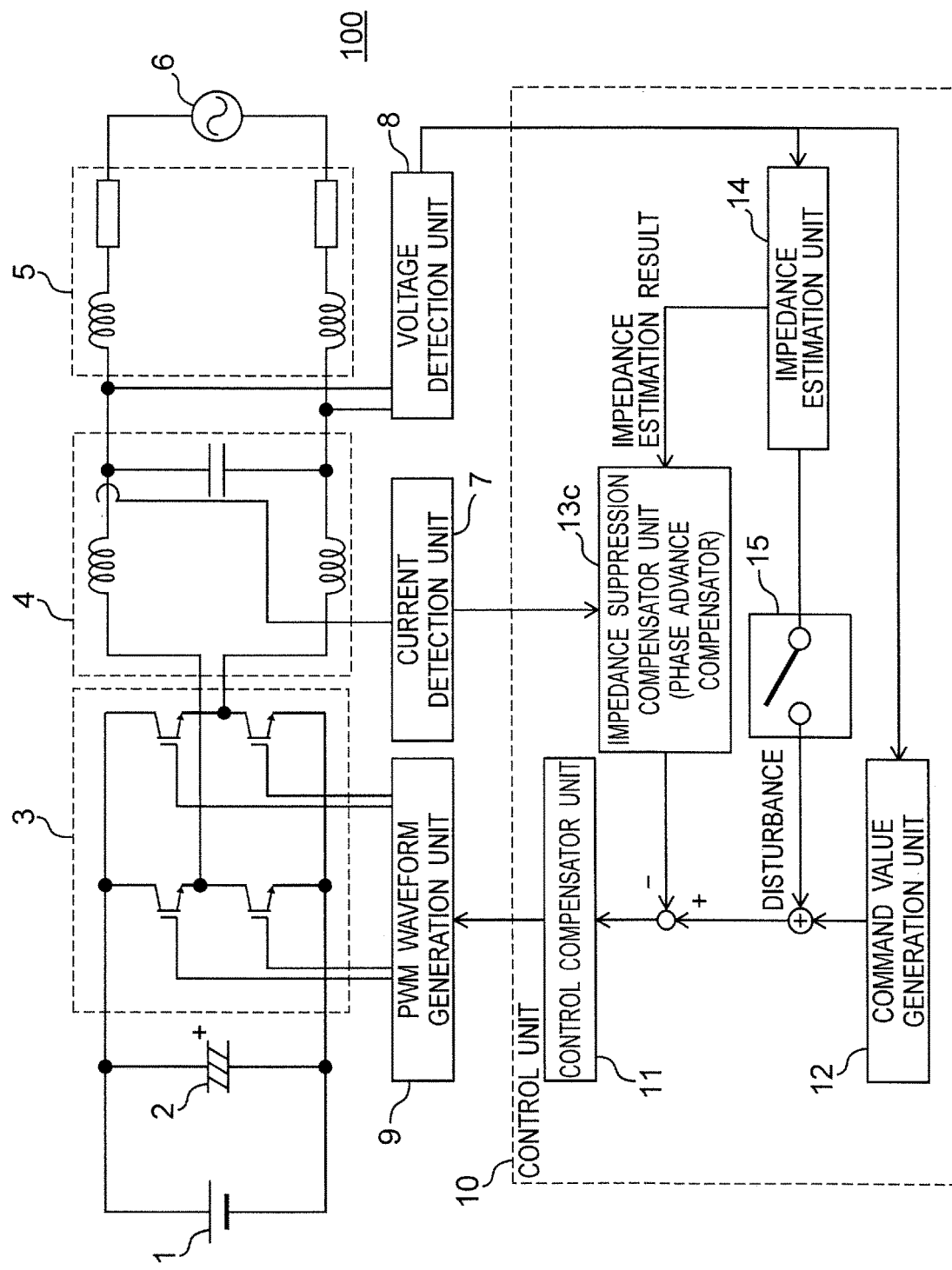
FIG. 12 is a diagram showing an exemplary configuration in which a phase advance compensator is applied to an impedance suppression compensator unit in a system interconnection inverter according to a second variation.

FIG. 12 shows an exemplary configuration of the system interconnection inverter 100 to which a phase advance compensator 13c is applied. The characteristics of the phase advance compensator 13c are shown by the following equation.

$$\frac{1 + sf_1}{1 + sf_2} \tag{5}$$

The control unit 10 sets the characteristics of the phase advance compensator 13c, by calculating the resonance point fs in accordance with the estimated value of the system impedance LineLz received from the impedance estimation unit 14 and equation (4), and setting the frequencies f1 and f2 shown in equation (5), based on the value of the calculated resonance point fs. In this way, phase delay due to the resonance point is suppressed by setting the characteristics of the phase advance compensator 13c based on the estimated value of the system impedance LineLz.

Specifically, in the phase advance compensator 13c, the break frequency is set in a frequency lower than the resonance point fs to advance the phase in the resonance point fs, and the relationship where the phase in the resonance point fs is less than 180 degrees is maintained. That is, in equation (5), the phase can be advanced in bands from fs−f1 to fs+f2, by setting f1 and f2 such that f1<fs and f2>fs are satisfied, based on the resonance point fs derived from the estimated value of the system impedance LineLz. The control system can thereby be stabilized. In this way, in the second variation, the control parameters (f1, f2) for controlling the amount of phase advance of the phase advance compensator 13c are set based on the estimated value of the system impedance LineLz.

4.3 Third Variation

In the third variation, yet another specific exemplary configuration of the impedance suppression compensator unit 13 in the control unit 10 will be described. In the third variation, an observer 13d is set as the impedance suppression compensator unit 13, and stability is secured through pole assignment by state feedback.

Figure 13:
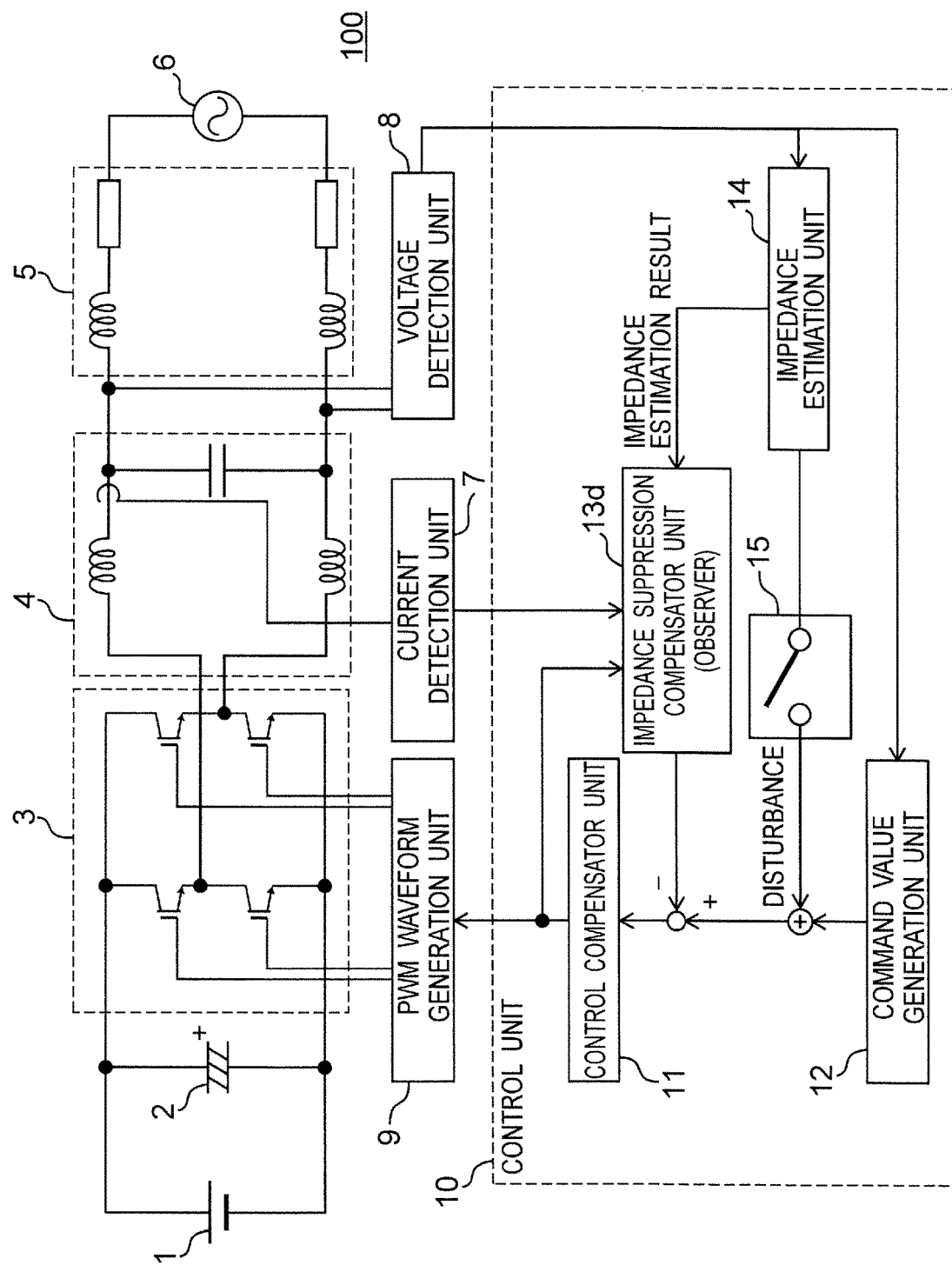
FIG. 13 is a diagram showing an exemplary configuration in which an observer is applied to an impedance suppression compensator unit in a system interconnection inverter according to a third variation.

FIG. 13 shows an exemplary configuration of the system interconnection inverter 100 to which the observer 13d is applied as the impedance suppression compensator unit 13. The impedance estimation unit 14 in the third variation also calculates an estimated value (Rz) of the real part of the system impedance. Specifically, the impedance estimation unit 14 calculates a value Z of the overall system impedance including both the real part and the imaginary part from the voltage signal and the current signal. The impedance estimation unit 14 then derives the estimated value (Rz) of the real part of the system impedance from the value (Z) of the overall system impedance and the estimated value (LineLz) of the imaginary part of the system impedance, based on the following relational equation.

$$Z^2 = \sqrt{Rz^2 + LineLz^2} \tag{6}$$

The observer 13d is built to behave in the same manner as a circuit model of the system interconnection inverter 100. The observer 13d reflects the estimation result by the impedance estimation unit 14 in the circuit model. That is, the observer 13d substitutes the estimated value (Rz) of the real part of the system impedance as the resistance component and the estimated value (LineLz) of the imaginary part of the system impedance as the inductance component in the circuit model, performs simulation, and outputs the simulation result of the output current value of the inverter circuit 3. The observer 13d derives an end-to-end voltage of the system impedance that has not actually been measured and the estimated value of the current, and builds state feedback based on these estimated values. The observer 13d sets the state feedback gain, and secures stability through pole assignment. In this way, in the third variation, circuit constants of the circuit model of the observer 13d are set as control parameters, based on the estimated value of the system impedance LineLz. Note that, with respect to the observer 13d, a configuration may be adopted in which only the estimated value (LineLz) of the imaginary part of the system impedance is substituted.

4.4 Fourth Variation

In the above embodiment, the amplitude of the disturbance signal is given as being constant (fixed) during injection of the disturbance signal. In this case, depending on the Q value of the resonance of the system 6 serving as the load, the injected disturbance signal may be greatly amplified, and the disturbance signal may excessively affect the system 6. In the fourth variation, a configuration for reducing the effect on the system 6 due to such amplification of the disturbance signal will be described.

Figure 14:
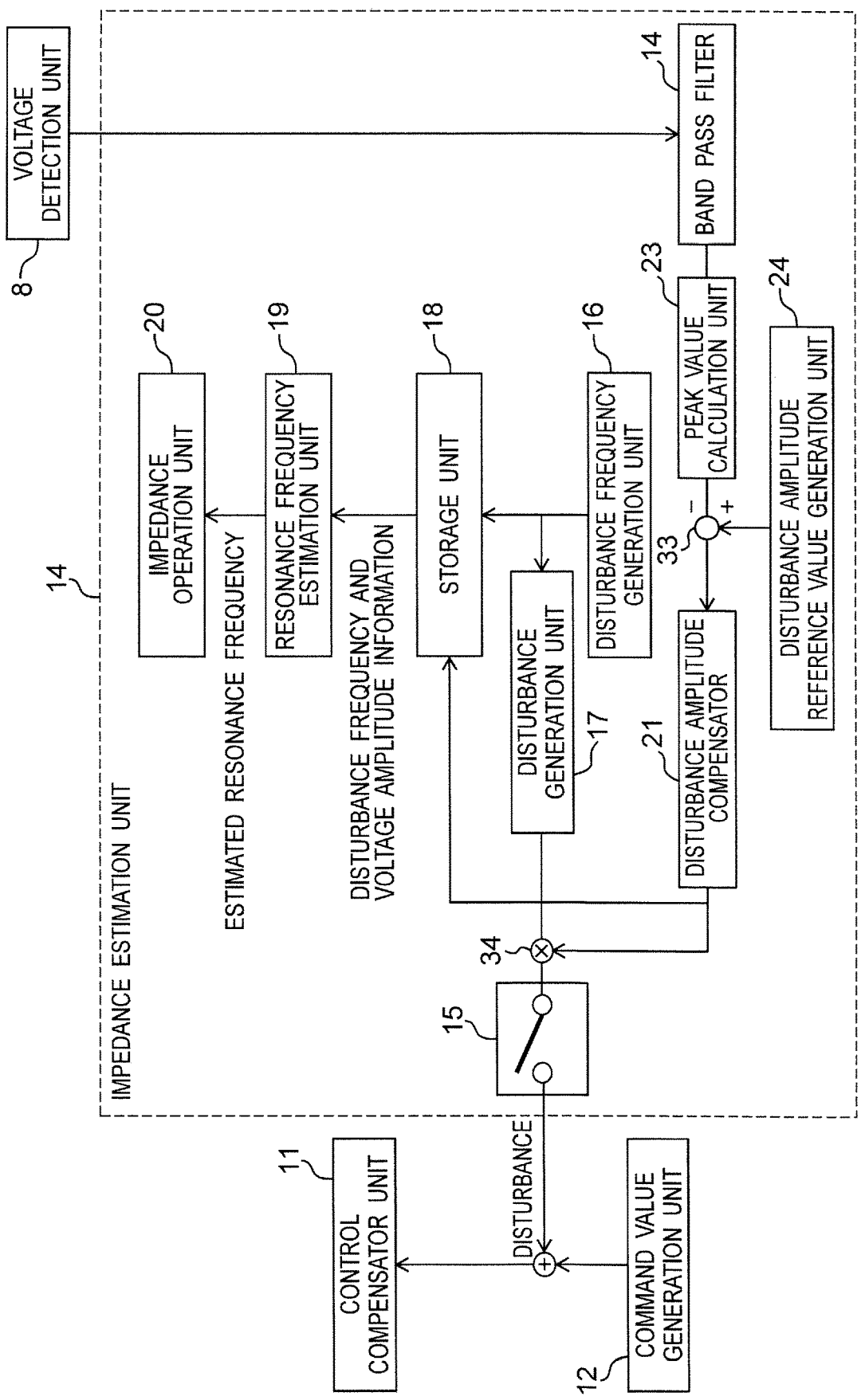
FIG. 14 is a diagram showing an exemplary hardware configuration of an impedance estimation unit in a system interconnection inverter according to a fourth variation.

The system interconnection inverter 100 of the fourth variation differs from above embodiment in the configuration of the impedance estimation unit. FIG. 14 is a diagram schematically showing an exemplary hardware configuration of an impedance estimation unit 14b in the system interconnection inverter 100 of the fourth variation. The impedance estimation unit 14b of the fourth variation has a function of controlling the amplitude of the disturbance signal that is injected. Thus, as shown in FIG. 14, the impedance estimation unit 14b is further provided with a band pass filter 22, a peak value calculation unit 23, a disturbance amplitude reference value generation unit 24, a disturbance amplitude compensator 21, a subtractor 33 and a multiplier 34, in addition to the configuration of the impedance estimation unit 14 shown in FIG. 3.

The band pass filter 22 passes only a signal of the same frequency component as the disturbance signal in the voltage signal from the voltage detection unit 8. The peak value calculation unit 23 receives the output from the band pass filter 22, and calculates the peak value of the voltage of the system.

The disturbance amplitude reference value generation unit 24 sets the reference value of the amplitude of the disturbance signal which is a sine wave. For example, in the case where it is assumed that the maximum value of the peak value of the output voltage is "1", "1" is set as a reference value of the amplitude of the disturbance signal.

The subtractor 33 computes the difference between the reference value set by the disturbance amplitude reference value generation unit 24 and the peak value derived by the peak value calculation unit 23. The disturbance amplitude compensator 21 generates gain for controlling the amplitude of the disturbance signal, based on the difference computed by the subtractor 33.

The multiplier 34 multiplies the command value output by the disturbance generation unit 17 by the gain generated by the disturbance amplitude compensator 21, and outputs the resultant value as a final disturbance command value. At this time, the gain that is output by the disturbance amplitude compensator 21 is stored in the storage unit 18 in association with the frequency of the disturbance signal, for every frequency that is changed.

As a result of a configuration such as described above, the amplitude of the disturbance signal that is injected into the system 6 is controlled (adjusted) based on a fluctuation component (amplitude) caused by the injected disturbance signal. That is, when there is a large fluctuation in the power of the system 6 caused by the disturbance signal injected into the system 6, control is performed such that the amplitude of the disturbance signal decreases. The fluctuation in power due to the disturbance signal that is injected into the system 6 can thereby be suppressed, and the effect of disturbance injection on the system 6 can be reduced.

4.5 Fifth Variation

In the system interconnection inverter 100 shown in FIG. 2, a current component that occurs due to the injected disturbance is also included in the current signal that is detected by the current detection unit 7, while the disturbance signal is being injected, in addition to the current component that occurs due to the original command value output by the command value generation unit 12. At this time, the control compensator unit 11, in the case where this current signal is used as the feedback signal, suppresses the disturbance signal injected into the system, and, as a result, the correct response signal may not be obtained. In the fifth variation, a configuration of the system interconnection inverter 100 that solves this problem will be described.

Figure 15:
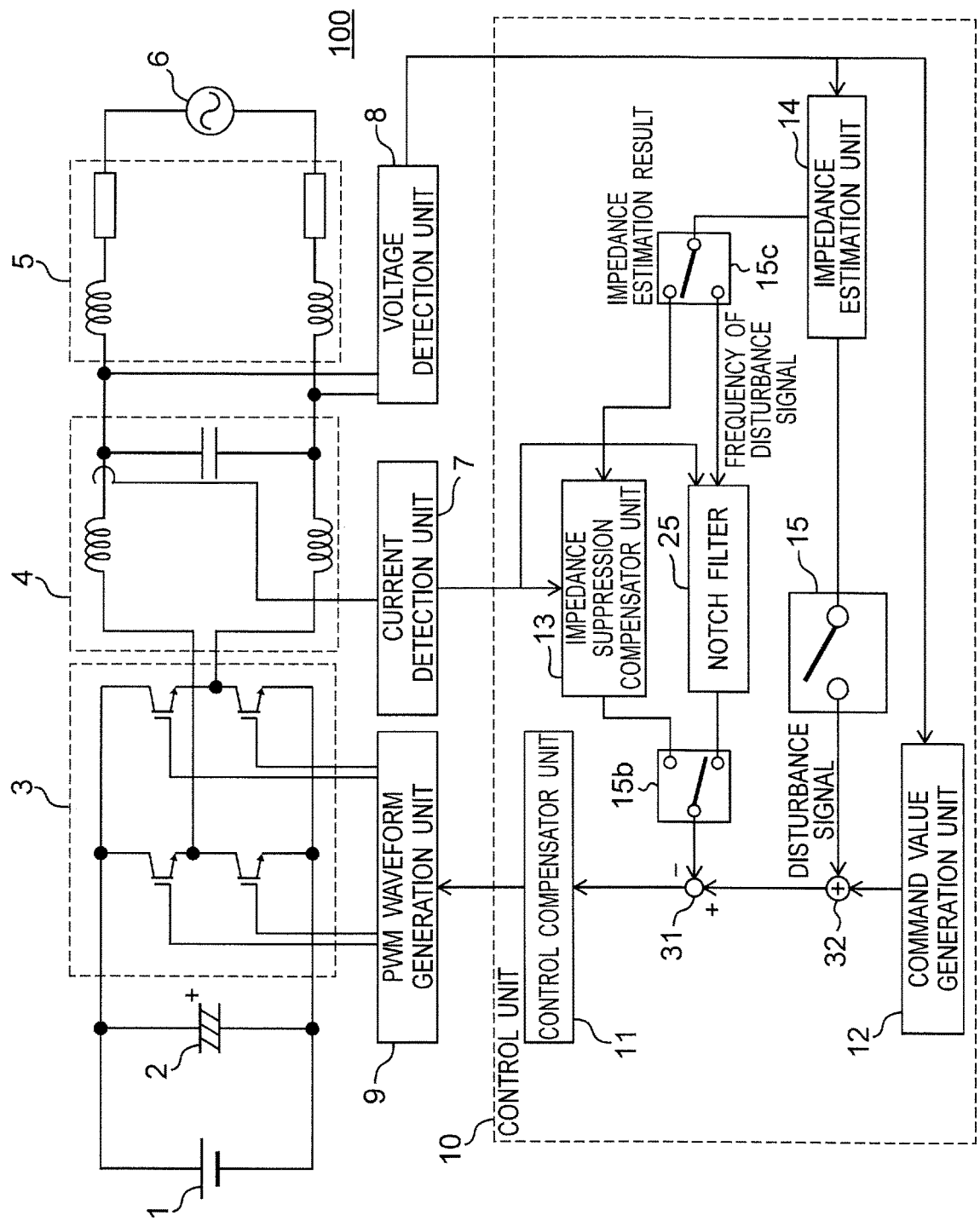
FIG. 15 is a diagram showing an exemplary hardware configuration of a system interconnection inverter according to a fifth variation.

FIG. 15 is a diagram showing an exemplary configuration of the system interconnection inverter 100 in the fifth variation. As shown in FIG. 15, the control unit 10 in the system interconnection inverter 100 of the fifth variation is further provided with a notch filter 25 and changeover switches 15b and 15c, in addition to the configuration shown in FIG. 2.

The notch filter 25 is a filter having characteristics such as shown in equation (3), and attenuates the signal of a predetermined band (center frequency fs). The current signal is input to the notch filter 25 from the current detection unit 7.

The changeover switch 15b selectively connects the output of one of the impedance suppression compensator unit 13 and the notch filter 25 to the subtractor 31. The changeover switch 15c selectively connects the output of the impedance estimation unit 14 to the input of one of the impedance suppression compensator unit 13 and the notch filter 25.

While disturbance is being injected in order to derive an estimated value of the system impedance, the control unit 10 performs control to connect the changeover switches 15b and 15c to the notch filter 25 side. Information indicating the frequency of the disturbance signal is thereby input from the impedance estimation unit 14 to the notch filter 25 via the changeover switch 15c.

The notch filter 25 sets the center frequency fs to the same frequency as the frequency of the disturbance signal, in accordance with the information input from the impedance estimation unit 14. The notch filter 25 thereby outputs a signal that result from removing the signal of the same frequency component as the disturbance signal from the current signal output by the current detection unit 7. In this way, by using the notch filter 25 to suppress, in the current signal, only the frequency band of the disturbance signal that is being injected, the control response can be desensitized in only the injection frequency band. As a result, the correct response signal can be obtained for the disturbance signal.

After calculation of the estimated value of the system impedance has ended (i.e., after the end of injection of the disturbance signal), the changeover switches 15*b* and 15*c* are switched to the impedance suppression compensator unit 13 side. At the time of normal operation of the system interconnection inverter 100, the current signal is thereby processed by the impedance suppression compensator unit 13 in which control parameters were set based on the estimated system impedance value, as described above. Stable control can thereby be realized.

Note that, in the case of using a notch filter 13*b* such as shown in FIG. 10 as the impedance suppression compensator unit 13, the notch filter 13*b* may be operated as the notch filter 25, during the operation for estimating the system impedance. In this case, the changeover switches 15*b* and 15*c* are not required.

The specific configurations described in the fourth and fifth variations can be combined as appropriate with the configurations described in the above embodiment and other variations.

The embodiment described above is merely an illustrative example of a specific configuration of the present invention. Needless to say, various improvements through modification, substitution, deletion and the like can be made, without departing from the scope of the present invention.

5 Additional Remarks

The description in the above embodiment discloses the following configurations.

(A) A power converter (100) for converting DC power from a DC power supply (1) into AC power and outputting AC power to a load (6), including:

an inverter unit (3) configured to convert DC power from the DC power supply into AC power;

a voltage detection unit (8) configured to detect a voltage of the load and generate a voltage signal;

a current detection unit (7) configured to detect an output current of the inverter unit and generate a current signal; and a control unit (10) configured to generate a control signal for controlling the inverter unit, the control unit (10) including:

an impedance estimation unit (14) configured to inject a disturbance signal into the load, and derive an estimated value of an impedance of the load into which the disturbance signal is injected, based on the voltage signal from the load;

an impedance compensator unit (13) in which a control parameter is set based on the estimated value of the impedance, and that is configured to correct the current signal in accordance with the control parameter;

a command value generation unit (12) configured to output a command value indicating a control target value; and a control compensator unit (11) configured to generate a control signal based on the command value from the command value generation unit and the current signal from the impedance compensator unit.

As a result of this configuration, the estimated value of the impedance of the load is derived, and a control parameter is set based on the estimated value. Impedance compensation adapted to the use environment (i.e., the impedance of the load) of the power converter can thus be realized, and favorable control adapted to the characteristics of the load can be realized.

(B) In the power converter of (A), the impedance estimation unit may derive the imaginary part (LineLz) of the impedance of the load as the estimated value of the impedance. The imaginary part of the impedance greatly affects control stability. Therefore, control stability can be further improved, by deriving the imaginary part of the impedance.

(C) In the power converter of (A), the impedance compensator unit (13) may inject the disturbance signal into the load (6) while changing the frequency within a predetermined range, measure the voltage signal for every frequency from the load into which the disturbance signal is injected, and derive an estimated value of the impedance based on the frequency (fc) of the disturbance signal when a voltage signal at a maximum is received. As a result of this method, the estimated value of the impedance can be accuracy derived (refer to FIGS. 9A and 9B).

(D) In any of the power converters of (A) to (C), the impedance compensator unit (13) may be a notch filter (13*b*) configured to attenuate a predetermined band component, in the current signal, that includes a center frequency, and the center frequency of the notch filter may be set based on the estimated value (LineLz) of the impedance. As a result of the notch filter, an increase in gain due to the resonance point of the system impedance (LineLz) and the impedances (ACL, ACC) of the LC filter circuit 4 can be suppressed, and the control system can be stabilized.

(E) In any of the power converters of (A) to (C), the impedance compensator unit (13) may be a phase advance compensator (13*c*) configured to advance the phase of the current signal, and characteristics of the phase advance compensator may be set based on the estimated value of the impedance. As a result of this configuration, phase delay due to the resonance point of the system impedance (LineLz) and the impedances (ACL, ACC) of the LC filter circuit 4 can be suppressed, and the control system can be stabilized.

(F) In any of the power converters of (A) to (C), the impedance compensator unit (13) may be an observer (13*d*) configured to simulate a circuit model of the power converter, and the value of the impedance in the circuit model may be set based on the estimated value (LineLz) of the impedance. As a result of this configuration, stability can be secured through pole assignment by state feedback.

(G) In any of the power converters of (A) to (F), the impedance estimation unit (14*b*) may be provided with a disturbance amplitude compensator (21) configured to control the amplitude of the disturbance signal that is injected into the load (6), such that the amplitude of the signal of the same frequency component in the voltage signal as the disturbance signal is constant (refer to FIG. 14). As a result of this configuration, the effect of amplification of the disturbance signal on the load (6) can be reduced.

(H) In any of the power converters of (A) to (F), the control unit (10) may be further provided with a filter (25) configured to remove the signal of the same frequency component in the current signal as the disturbance signal, at the time of injecting the disturbance signal into the load (refer to FIG. 15). A current signal serving as a feedback signal can thereby be accurately obtained, at the time of injecting the disturbance signal.

(I) In any of the power converters of (A) to (F), the control unit (10) is further provided with a changeover unit (15) configured to switch between injecting and not injecting the disturbance signal from the impedance estimation unit (14) into the load (6).

The invention claimed is:

1. A power converter for converting DC power from a DC power supply into AC power and outputting the AC power to a load, comprising:

an inverter unit configured to convert DC power from the DC power supply into AC power;
a voltage detection unit configured to detect a voltage of the load, and generate a voltage signal;
a current detection unit configured to detect an output current of the inverter unit, and generate a current signal; and
a control unit configured to generate a control signal for controlling the inverter unit, the control unit comprising a processor configured to perform operations comprising operation as:
an impedance estimation unit configured to inject a disturbance signal into the load, and derive an estimated value of an impedance of the load based on the voltage signal from the load into which the disturbance signal is injected;
an impedance compensator unit in which a control parameter is set based on the estimated value of the impedance, and that is configured to correct the current signal in accordance with the control parameter;
a command value unit configured to output a command value indicating a control target value; and
a control compensator unit configured to generate the control signal, based on the command value from the command value unit and the current signal from the impedance compensator unit, wherein
the processor is configured such that operation as the impedance compensator unit comprises operation as the impedance compensator unit that is configured to inject the disturbance signal into the load while changing a frequency within a predetermined range, measure the voltage signal for every frequency from the load into which the disturbance signal is injected, and derive the estimated value of the impedance based on the frequency of the disturbance signal in response to a voltage signal at a maximum being received.

2. The power converter according to claim 1, wherein the processor is configured such that operation as the impedance estimation unit comprises operation as the impedance estimation unit that is configured to derive an imaginary part of the impedance of the load as the estimated value of the impedance.

3. The power converter according to claim 1, wherein the processor is configured such that operation as the impedance compensator unit comprises operation as the impedance compensator unit comprising a notch filter configured to attenuate a predetermined band component that includes a center frequency in the current signal, and the center frequency of the notch filter is set based on the estimated value of the impedance.

4. The power converter according to claim 1, wherein the processor is configured such that operation as the impedance compensator unit comprises operation as the impedance compensator unit comprising a phase advance compensator configured to advance a phase of the current signal, and a characteristic of the phase advance compensator is set based on the estimated value of the impedance.

5. The power converter according to claim 1, wherein the processor is configured such that operation as the impedance compensator unit comprises operation as the impedance compensator unit that comprises an observer device that simulates a circuit model of the power converter, outputs a simulation result of an output current value of the inverter unit, and derives estimated values of a voltage across the impedance and a current, which are not actually measured, and a value of the impedance in the circuit model is set based on the estimated value of the impedance.

6. The power converter according to claim 1, wherein the processor is configured such that operation as the impedance estimation unit comprises operation as the impedance estimation unit comprising a disturbance amplitude compensator configured to control an amplitude of the disturbance signal that is injected into the load, such that an amplitude of a signal of a frequency component in the voltage signal, which is identical to a frequency component of the disturbance signal, is constant.

7. The power converter according to claim 1, wherein the control unit further includes a filter configured to remove a signal of a frequency component in the current signal, which is identical to a frequency component of the disturbance signal, at a time of injecting the disturbance signal into the load.

8. The power converter according to claim 1, wherein the processor is configured to perform operations further comprising operation as a changeover unit configured to switch between injecting and not injecting the disturbance signal from the impedance estimation unit into the load.

* * * * *